US012758894B2

(12) United States Patent
Suarez

(10) Patent No.: US 12,758,894 B2
(45) Date of Patent: Oct. 13, 2026

(54) ARRANGEMENT FOR THE PRODUCTION OF TABLE SALT, ELECTRICITY GENERATION AND SEAWATER HEATING

(71) Applicant: Jose Miguel Tordecilla Suarez, Vina del Mar (CL)

(72) Inventor: Jose Miguel Tordecilla Suarez, Vina del Mar (CL)

( * ) Notice: Subject to any disclaimer, the term of this patent is extended or adjusted under 35 U.S.C. 154(b) by 147 days.

(21) Appl. No.: 18/727,702

(22) PCT Filed: Dec. 21, 2022

(86) PCT No.: PCT/CL2022/050135
§ 371 (c)(1),
(2) Date: Jul. 10, 2024

(87) PCT Pub. No.: WO2023/133649
PCT Pub. Date: Jul. 20, 2023

(65) Prior Publication Data

US 2025/0099869 A1 Mar. 27, 2025

(30) Foreign Application Priority Data

Jan. 13, 2022 (CL) .................................... 100-2022

(51) Int. Cl.

| | |
|---|---|
| ***B01D 1/20*** | (2006.01) |
| ***B01D 1/00*** | (2006.01) |
| ***C02F 1/12*** | (2023.01) |
| *C02F 103/08* | (2006.01) |

(52) U.S. Cl.
CPC ............. *B01D 1/20* (2013.01); *B01D 1/0023* (2013.01); *C02F 1/12* (2013.01); *C02F 2103/08* (2013.01)

(58) Field of Classification Search
CPC . B01D 1/20; B01D 1/0023; C02F 1/12; C02F 2103/08
See application file for complete search history.

(56) References Cited

U.S. PATENT DOCUMENTS

| | | | | |
|---|---|---|---|---|
| 4,950,130 A * | 8/1990 | Erlach | ........................ | F03B 1/00 416/197 B |
| 5,086,622 A * | 2/1992 | Warner | .................. | B64D 13/06 62/88 |
| 5,186,822 A * | 2/1993 | Tzong | ..................... | F03B 13/18 210/257.2 |
| 8,025,157 B2 * | 9/2011 | Takita | ..................... | C02F 1/441 210/257.2 |

(Continued)

*Primary Examiner* — Jonathan Miller
(74) *Attorney, Agent, or Firm* — Kevin J Fournier Intellectual Property Legal Services Ltd; Kevin J Fournier

(57) ABSTRACT

An arrangement which is composed of two systems, a mechanical system and an evaporation system, powered only by an electric motor, connected together by means of a cardan shaft system to a crankshaft, The crankshaft then moves a system of levers which by means of a gearbox gives speed to a system of pistons and radial cylinders of the mechanical system, which drive a Pelton turbine, which is driven by means of the mechanical system through the rings or cores S1, S2, S3 . . . connected to a rotation shaft to produce a rotating shaft. connected to a rotating shaft to produce the evaporation of seawater and desalination, a system which through different arrangements allows to generate heat energy, to heat the water and additionally to generate electrical energy.

5 Claims, 4 Drawing Sheets

(56) References Cited

U.S. PATENT DOCUMENTS

| | | | | |
|---|---|---|---|---|
| 9,024,461 | B2 * | 5/2015 | Chen | F03D 9/008 290/53 |
| 11,396,469 | B2 * | 7/2022 | Al-Anzi | B01D 3/065 |
| 11,591,241 | B2 * | 2/2023 | Riley | F01K 27/02 |
| 2009/0110563 | A1 * | 4/2009 | Takita | C02F 1/441 417/399 |
| 2013/0291532 | A1 * | 11/2013 | Chen | C02F 1/04 60/495 |
| 2015/0128622 | A1 * | 5/2015 | Filippone | F25B 27/02 62/238.3 |
| 2022/0204374 | A1 * | 6/2022 | Al-Anzi | B01D 1/00 |

* cited by examiner

ARRANGEMENT FOR THE PRODUCTION OF TABLE SALT, ELECTRICITY GENERATION AND SEAWATER HEATING

FIELD OF INVENTION

The present invention relates to a method and system of radial hydraulic injection core, for evaporating seawater so as to desalinate it for salt production and with different arrangements and minimum energy consumption at its input, generate either thermal or electrical energy and air-condition the water.

BACKGROUND OF THE INVENTION

Aspects of this invention relate in general to systems and methods for the evaporation of seawater and for the generation of energy, since it is based on suitable mechanisms.

In the state of the art there are patents related to similar systems for seawater desalination, for example in the European patent No. WO2012108754A2 is described a process for desalinating seawater, which is mainly based on an improved filter, which is based on reverse osmosis, more oriented towards desalination rather than energy generation or air conditioning.

There are certain disadvantages related to seawater desalination systems and methods, which are related to high energy consumption, expensive equipment and impact on marine ecosystems.

On the other hand, pretreatment is necessary, where the membranes used for reverse osmosis are very sensitive. So, unless some more resistant membrane material is developed, pretreatment is an important requirement. Without it, the membrane can become virtually useless, decreasing performance or producing impure water. Improperly pretreated seawater can deposit particulates on the membrane. These contaminants affect the proper membrane flux and pressure, which increases the operating cost.

One embodiment of such a system and method can be found in U.S. Patent No. U.S. Pat. No. 4,333,832A relating to a rotary solution separation system, wherein salt water and other solutions are accelerated in a rotating structure and applied to a vessel containing reverse osmosis membrane material. The desalinated water is removed after passing through the large surface area of membrane material concentration in the vessel. The enriched brine is removed from the vessel at the point farthest from the axis of the rotating structure and is returned to the vicinity of the axis to avoid accumulation of dense material. The membrane material is configured in the vessel so that the flow is generally radial with respect to the axis of the rotating structure. It comes back to the same drawback of the problem related to filters.

SUMMARY OF THE INVENTION

Aspects of the present invention can be used to advantageously provide a hydraulic radial injection core system, for the evaporation of water so as to desalinate seawater, with minimum energy consumption and additionally to generate either thermal or electrical energy.

The system can operate in industries for seawater desalination, air conditioning of homes and buildings, vacuum cooling, minimum and medium scale power generation with turbines, thermal generation for heating of industries, homes and buildings, food industries, wastewater industries.

DETAILED DESCRIPTION OF THE INVENTION

Figure 1:
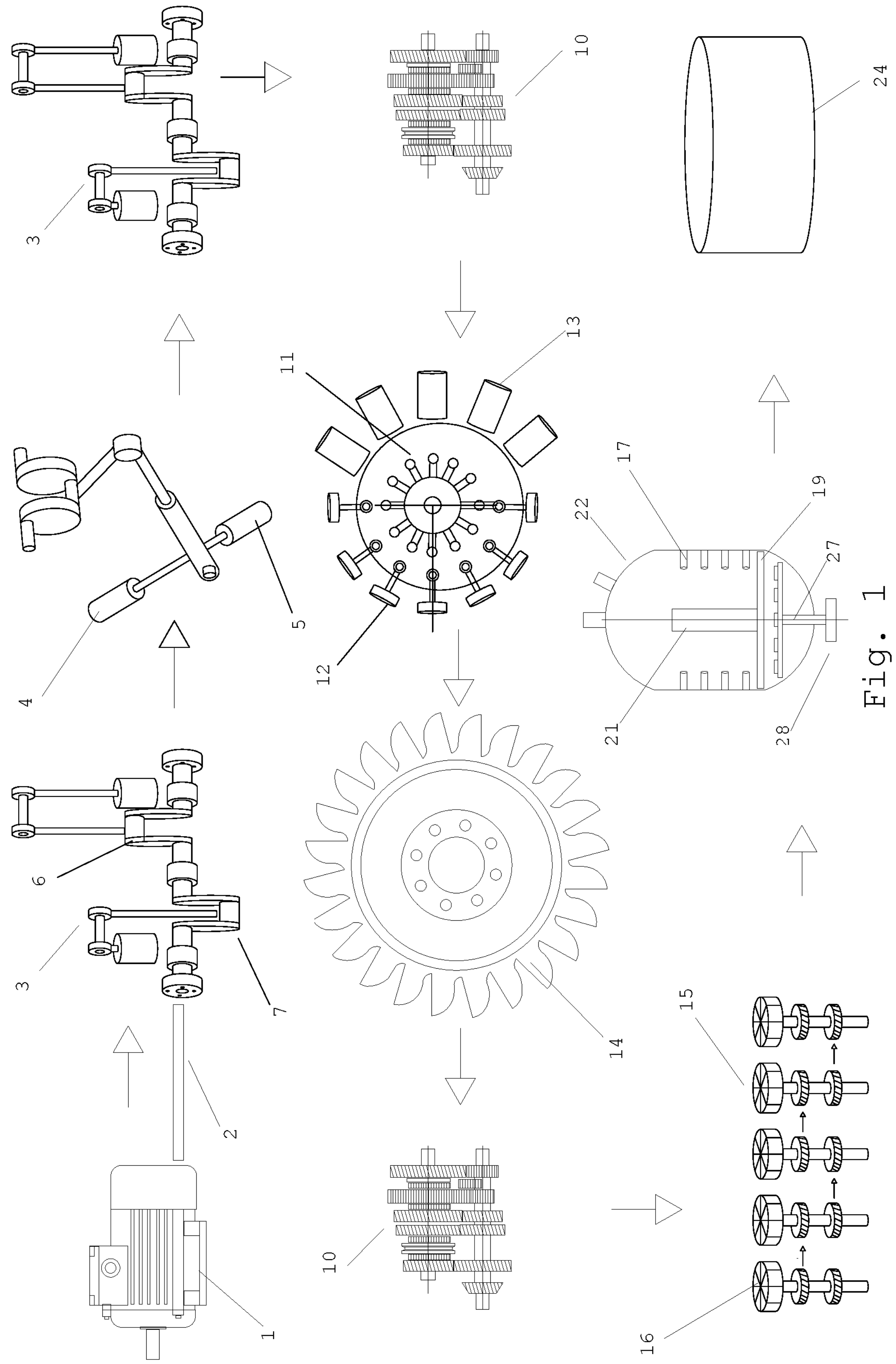
FIG. 1, a schematic diagram of the operation of the systems, according to the invention, is observed.

FIG. 1 shows parts of the mechanical system (29) of the arrangement, which is operated by means of a single electric motor (1), connected by means of cardan shafts (2) which move along a longitudinal extension, connected by means of crankshafts (3) (as hydraulic levers) which operate in an upward and downward direction arranged at an angle of 45°, using two compression pistons, one upper (4) and one lower (5), for the injection of liquid or air, thus taking advantage of both the rise and fall of the piston for the injection of hydraulic liquid. Once this process is finished, the hydraulic levers (9) of the first crankshaft (3) ascend from the PMI (7) to the PMS (6), and the second crankshaft (3) ascends from the PMS (6) to the PMI (7).

The crankshaft (3) is arranged at a 30° angle of inclination, which avoids a very high torsional stress, allowing a complete cycle of the crankshafts (3) without major stresses.

Subsequently, these crankshafts (3) are connected by means of a gear box (10) to sections S1, S2, S3, S4 and S5 of rings or cores (8), being able to be used the sections that are needed according to the requirements. The gear box (10) is connected to the radial injector (8), which allows the injection of air or liquid or both. Each core S1, S2, S3, S4 and S5, comprises two lifters, a hydraulic lever system (9), two crankshafts (3), a gearbox (10) and the radial injector (11).

Sections S1, S2, S3, S4 and S5, driven only by an electric motor (1) operate in unison.

Each section S1, S2 . . . acts directly and indirectly.

Figure 2:
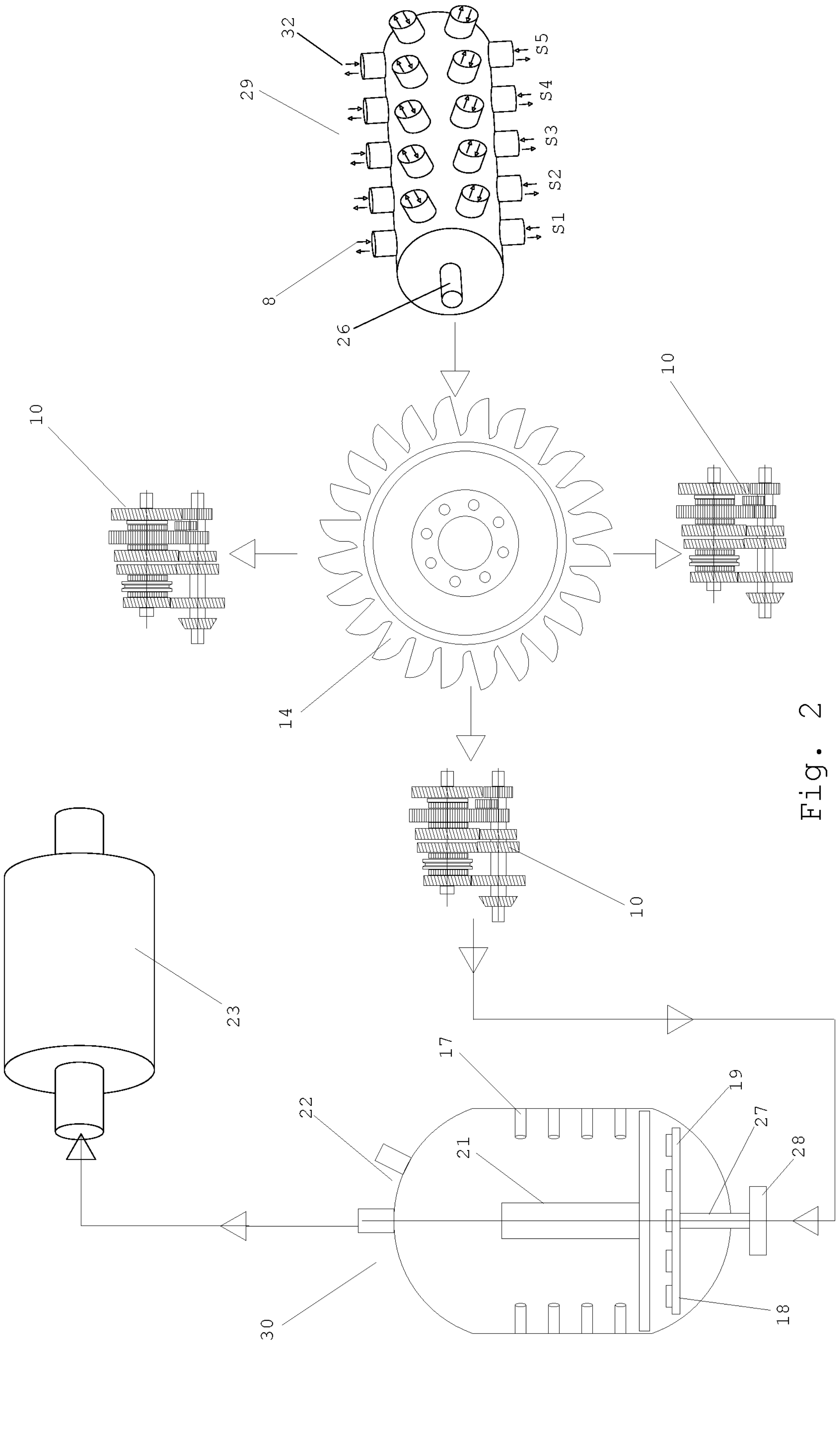
FIG. 2, shows a schematic diagram of the connection of system 1 with system 2, by means of a Pelton turbine and gearboxes, for desalination, in accordance with the invention.

Example of layout, (see FIG. 2) the S1 section is responsible for inject enough m3 of hydraulic fluid to rotate a Pelton turbine (14), in this case S1 keeps in motion the Pelton turbine (14) which is connected by means of three gear boxes (10) that allow to have speeds and relieve the angular momentum, or angular torsion, These gear boxes (10) are connected to a central shaft (27) by means of a rotation gear (28). Additionally, the system is directly connected to an evaporation chamber (22).

Figure 3:
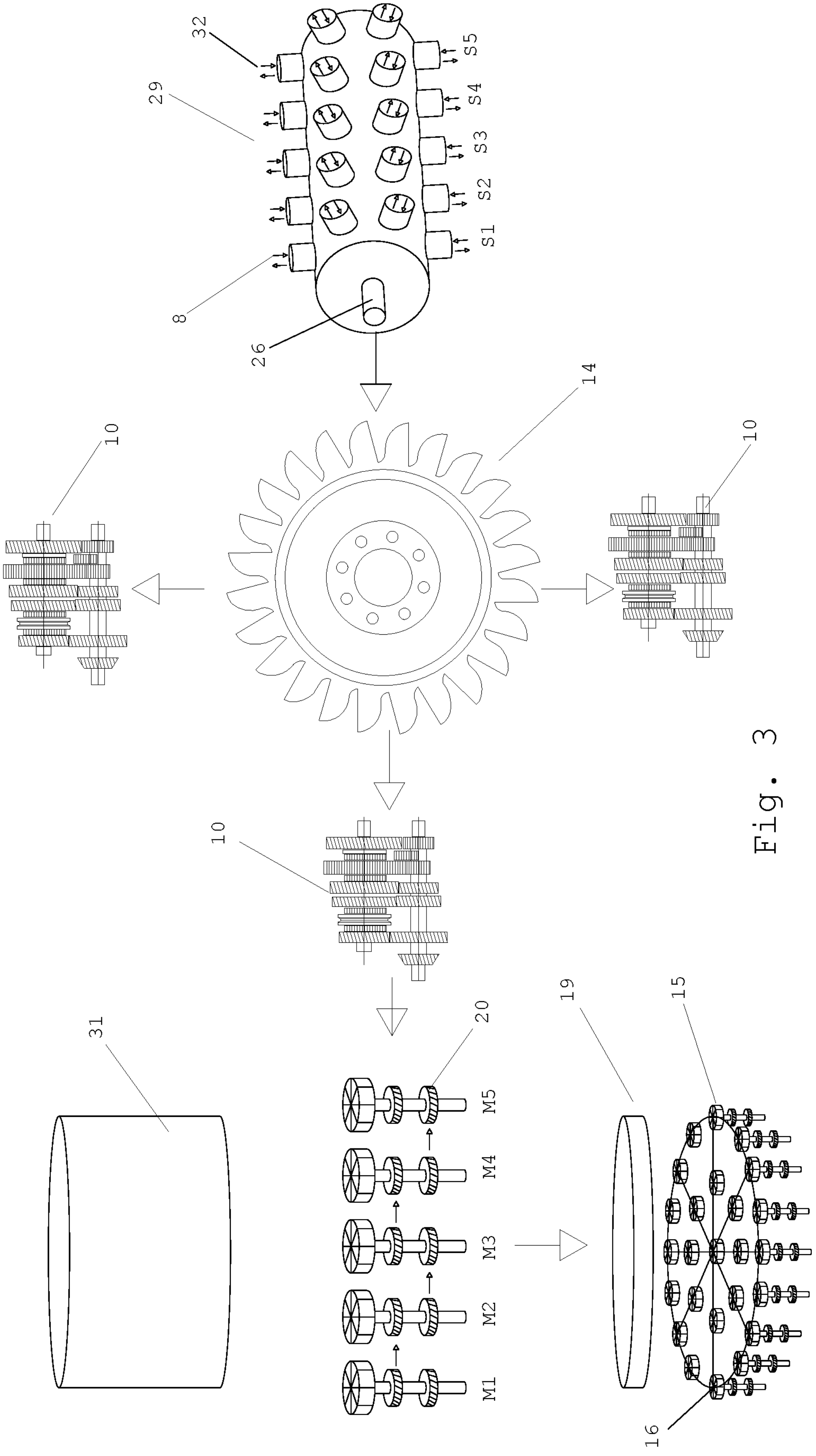
FIG. 3 shows a schematic diagram of the connection of system 1 with a Halbach Matrix, by means of a Pelton turbine, in such a way that of powering the neodymium magnets and inducing electric current to the induction plate and bar, for the generation of heat, in accordance with the invention.

Once the system 1, injected hydraulic liquid, spun the Pelton turbine (14) and the gearboxes (10) were placed in gear, the gearboxes (10) are connected to a central shaft (27), which at its upper end is located a Halbach Matrix (15), provided with Neodymium magnets (16) arranged in a N, S, E, W arrangement, so as to neutralize for example the south pole of the field and enhance the north pole of the neodymium magnet arrangement (16) (see FIG. 3).

All this arrangement of neodymium magnets (16) is connected to the matrix C1 of neodymium magnets (15) (16) by means of a chain of gears, to the matrix 2 and so on, so as to generate a rotation. In FIG. 3, it can be seen under the matrix (15) of neodymium magnets (16), is located an induction plate (19) of aluminum or copper of cylindrical shape of lower height, where it is enough only with the rotation of a matrix (18) to generate a rotation, inducing an electric current in the induction plate (19), the current will dissipate all the energy generating thermal energy.

Figure 4:
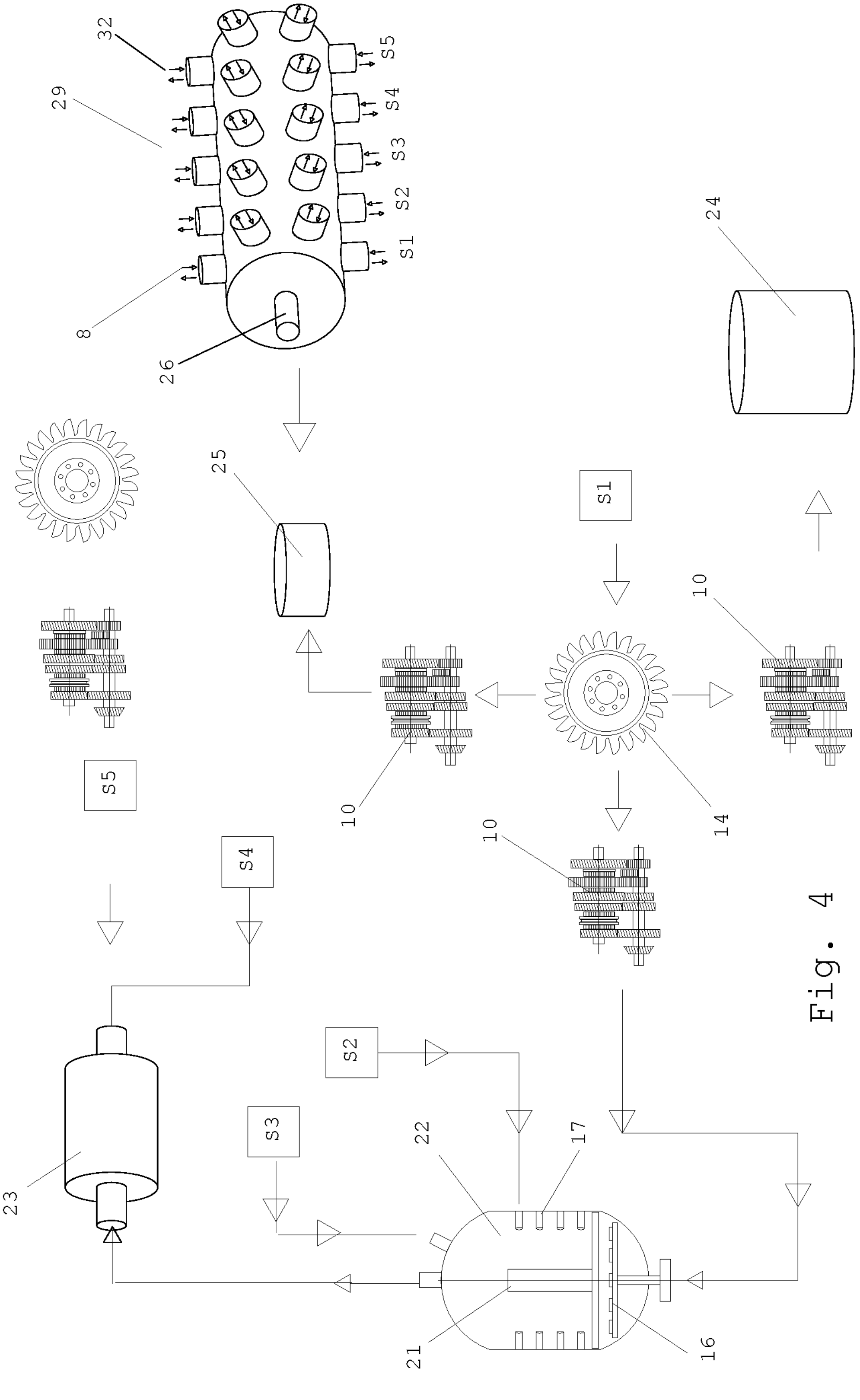
FIG. 4, shows a schematic diagram of the connection of system 1 with system 2, by means of a Pelton turbine and gearboxes, in accordance with the invention.

In FIG. 4, S1 is in charge of feeding a Pelton turbine (14), this Pelton turbine (14) gives torque to the gearbox (10), connected to a central shaft (27), inside the evaporation chamber (22), this central shaft (27) is connected to the Halbach matrix (15) which rotates and induces the inductive plate (19) and the induction bar (21).

S2 operates by aspirating seawater, which is injected by means of sprinklers or nozzles (17) under pressure as a spray in order to diffuse the water and lower the thermodynamic capacity of the seawater, so as to evaporate it faster.

S3 is responsible for lowering the pressure inside the evaporation chamber (22), the water can boil even at 10° Celsius, with all this heat induced by the matrix (15) of neodymium magnets (16), the low pressure, additionally produces evaporation to the water injected in the form of mist through the nozzles (17).

S4 is in charge of injecting air to the atmosphere exchanger (23), which takes all the water vapor from the evaporation chamber (22), transfers it to the inside of the atmosphere exchanger (23), working at 600 millibar, S4 injects air from the atmosphere, which passes through impurity filters, thus increasing the pressure inside the atmosphere exchanger (23), when it reaches the ambient pressure, the water increases its thermodynamic resistance, loses heat, the water becomes liquid and is recovered.

S5, is in charge of turning a Pelton turbine (14), by means of the gearbox (10), in order to suck all the steam from inside the evaporation chamber (22) and transfer it to the atmosphere exchanger (23). The gear box (10) transfers the liquid water to the final disposal (25), where it is analyzed and its solutes are checked and eventually it is seen if a reprocessing of it is required.

The second gear box (10) transports part of the salinity or brine from inside the evaporation chamber (22) to the drying chamber (24) and at ambient pressure operating with an array (15) of Neodymium magnets (16) with the difference that this chamber does not operate under pressure, inside this drying chamber (24) all the solute is dried so as to obtain table salt.

In a second mode, the whole of the mechanical system 1 (29) passes all its hydrodynamic capacity to a Pelton turbine (14), which gives torque to three gearboxes (10), rotates the Halbach matrices (15) with their neodymium magnets (16) connected to the rotating shaft (27), these matrices induce the induction plate (19), which heats the water at normal pressure and the two gear boxes (10) move the liquid through a system of pipes in order to be able to heat the water and allow air-conditioning.

Using this same arrangement, the system when operating with a Pelton turbine (14), only one gearbox (10), can generate electricity, generating a high amount of power through the Pelton turbine (14) with minimal consumption at the inlet (FIG. 5).

Transforming an energy into a lot of synergy.

INDUSTRIAL APPLICATION

The present invention according to its application finds use in the industry, and in particular in the mechanical industry, of seawater desalination, thermal plants, thermal or electrical power generation, water air conditioning, seawater evaporation, minimum energy consumption, 0 carbon emission.

LIST OF REFERENCE NUMBERS

1 Electric motor
2 Cardan
3 Crankshaft
4 Upper piston
5 Lower piston
6 Top dead center
7 Bottom dead center
8 Rings or cores
9 Lever system
10 Gearbox
11 Radial injector
12 Cylinder system
13 Piston system
14 Pelton Turbine
15 Halbach matrix
16 Neodymium magnets
17 Spray nozzles
18 Matrix M1, M2, M3 . . .
19 Cu or Al inductor plate
20 Chain and gear system
21 Inductor bar
22 Evaporating chamber
23 Atmosphere exchanger
24 Drying chamber
25 Final disposition
26 Crankshaft shaft
27 Axis of rotation
28 Rotation gear
29 Mechanical system 1
30 Evaporation system 2
31 Water tank
32 Air or water compression and suction chamber

The invention claimed is:

1. An arrangement comprising:

a mechanical system powered by an electric motor, the mechanical system comprising:
- a cardan shaft connected to the electric motor;
- a crankshaft driven by the cardan shaft and configured to actuate a lever
- a plurality of pistons and cylinders driven by the lever and arranged radially around the crankshaft;
- a plurality of sections S1, S2, S3, S4 and S5, each section comprising twelve radial cylinders, the sections being connected to a common rotation axis;
- at least one gear box operatively connected to the pistons and cylinders; and
- a Pelton turbine driven by pressurized fluid supplied from the radially arranged pistons and cylinders through the gearbox; and an evaporation system mechanically coupled to the mechanical system and comprising:
- an evaporation chamber;
- spray nozzles configured to inject seawater into the evaporation chamber as a mist; and
- an atmosphere exchanger fluidly connected to the evaporation chamber;

wherein:

the section S1 is configured to compress a hydraulic liquid to rotate the Pelton turbine and to drive, through the gearbox, a Halbach-type magnet array arranged to rotate relative to an induction plate made of aluminum or copper, wherein the rotation of the Halbach-type magnet array induces electric currents in the induction plate to generate thermal energy;

the section S2 is configured to aspirate seawater and inject the seawater through spray nozzles into the evaporation chamber under pressure to promote evaporation; the section S3 is configured to reduce pressure inside the evaporation chamber, wherein the induced thermal energy and reduced pressure jointly cause evaporation of the seawater injected as mist through the nozzles;

the section S4 is configured to inject filtered atmospheric air into the atmosphere exchanger to increase pressure therein and condense water vapor transferred from the evaporation chamber into liquid water; and the section S5 is configured to rotate the Pelton turbine, through the gearbox, to extract water vapor from the evaporation chamber (22) and transfer the water vapor to the atmosphere exchanger (23), and to transfer the condensed liquid water to a final disposal unit for analysis.

2. The arrangement according to claim 1, wherein the mechanical system comprises radial injectors configured such that each section S1-S5 injects 60 liters of hydraulic liquid or air per operating cycle, and wherein simultaneous operation of all five sections S1, S2, S3, S4, S5 inject 300 liters of hydraulic liquid or air, the injected hydraulic liquid or air being supplied to the Pelton turbine through three gearboxes to drive the turbine and actuate the evaporation system.

3. The arrangement according to claim 2, wherein the mechanical system is configured to supply pressurized fluid generated by the radial injectors to the Pelton turbine, the Pelton turbine being mechanically coupled to the three gearboxes, wherein a first gearbox of the three gear boxes is configured to drive the Halbach-type magnet array disposed adjacent to the induction plate to generate thermal energy for heating water at atmospheric pressure, and wherein a second and a third gearbox of the three gear boxes are configured to drive liquid circulation through piping circuits arranged to transfer thermal energy for water heating and air conditioning applications.

4. The arrangement according to claim 3, wherein the mechanical system is connected to the evaporation system and configured to supply the pressurized hydraulic liquid or air to the Pelton turbine, the Pelton turbine being coupled, through at least one gearbox, to rotate the Halbach-type magnet array arranged adjacent to the induction plate (19), and rotation of the Halbach-type magnet array induces electric currents in the induction plate, the induced currents generating thermal energy that is dissipated as heat within the evaporation chamber.

5. The arrangement according to claim 4, wherein the Halbach-type magnet array comprises 12 magnets of neodymium, arranged side by side to form a circle.

* * * * *